(12) United States Patent
Gong et al.

(10) Patent No.: US 12,481,695 B2
(45) Date of Patent: Nov. 25, 2025

(54) ARTIFICIAL INTELLIGENCE-BASED TECHNIQUES FOR AUTOMATED VISUAL DATA SEARCHING USING EDGE DEVICES

(71) Applicant: Dell Products L.P., Round Rock, TX (US)

(72) Inventors: Min Gong, Shanghai (CN); Qi Bao, Acton, MA (US); Qicheng Qiu, Shanghai (CN); Daniel Wu, Plano, TX (US); Shuangchen Huang, Singapore (SG); Rui Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 893 days.

(21) Appl. No.: 17/718,803

(22) Filed: Apr. 12, 2022

(65) Prior Publication Data
US 2023/0325432 A1      Oct. 12, 2023

(51) Int. Cl.
*G06F 16/432*  (2019.01)
*G06F 17/18*   (2006.01)
(Continued)

(52) U.S. Cl.
CPC ............ *G06F 16/434* (2019.01); *G06F 17/18* (2013.01); *G06F 18/24137* (2023.01);
(Continued)

(58) Field of Classification Search
CPC .. G06N 3/08; G06N 3/02; G06N 5/01; G06N 5/00; G06F 16/434; G06F 16/432;
(Continued)

(56) References Cited

U.S. PATENT DOCUMENTS 10,713,794 B1 *   7/2020  He ........................ G06N 3/084
11,475,684 B1 *  10/2022  Deng ..................... G06V 40/50
(Continued)

FOREIGN PATENT DOCUMENTS

EP           3754549 A1 *  12/2020   .......... G06V 10/764

OTHER PUBLICATIONS

Ferguson et al., "Detection and Segmentation of Manufacturing Defects with Convolutional Neural Networks and Transfer Learning", ARXIV ID: 1808.02518, Aug. 7, 2018, pp. 1-15. (Year: 2018).*

(Continued)

*Primary Examiner* — Hwei-Min Lu
(74) *Attorney, Agent, or Firm* — Ryan, Mason & Lewis, LLP

(57) ABSTRACT

Methods, apparatus, and processor-readable storage media for artificial intelligence-based techniques for automated visual data searching using edge devices are provided herein. An example computer-implemented method includes obtaining visual data from one or more edge devices; generating at least one automated searching tool by processing at least a portion of the obtained data using one or more artificial intelligence techniques; deploying the at least one automated searching tool to at least a portion of the one or more edge devices; and performing one or more automated actions based at least in part on data received, from at least a portion of the one or more edge devices, in connection with operation of the at least one automated searching tool.

20 Claims, 6 Drawing Sheets

(51) Int. Cl.
    *G06F 18/2413*     (2023.01)
    *G06N 5/01*     (2023.01)
    *G06V 10/44*     (2022.01)
    *G06V 10/77*     (2022.01)
    *G06V 10/774*     (2022.01)
    *G06V 10/82*     (2022.01)

(52) U.S. Cl.
    CPC .............. *G06N 5/01* (2023.01); *G06V 10/454* (2022.01); *G06V 10/7715* (2022.01); *G06V 10/774* (2022.01); *G06V 10/82* (2022.01)

(58) Field of Classification Search
    CPC ............... G06F 16/43; G06F 18/24137; G06F 18/24133; G06F 18/2413; G06F 18/241; G06F 18/24; G06F 17/18; G06F 17/10; G06F 17/00; G06V 10/454; G06V 10/451; G06V 10/449; G06V 10/443; G06V 10/44; G06V 10/40; G06V 10/82; G06V 10/774; G06V 10/7715; G06V 10/77; G06V 10/70
    USPC ...................................................... 706/15, 25
    See application file for complete search history.

(56) References Cited

U.S. PATENT DOCUMENTS

| | | | | |
|---|---|---|---|---|
| 2018/0137551 | A1* | 5/2018 | Zheng | G06F 18/214 |
| 2020/0004886 | A1* | 1/2020 | Ramanath | G06F 16/248 |
| 2020/0034455 | A1* | 1/2020 | Chandra Sekar Rao | G06V 20/10 |
| 2020/0349707 | A1* | 11/2020 | Hosseini | G06V 10/7788 |
| 2020/0387783 | A1* | 12/2020 | Bagherinezhad | G06F 16/90335 |
| 2021/0124966 | A1* | 4/2021 | Blais-Morin | G06V 10/751 |
| 2021/0181758 | A1* | 6/2021 | Das | G06F 18/25 |
| 2021/0271870 | A1* | 9/2021 | Ni | G06V 10/82 |
| 2021/0334295 | A1* | 10/2021 | Zhu | G06F 16/214 |
| 2022/0207079 | A1* | 6/2022 | Shebl | G06N 3/0442 |
| 2022/0261434 | A1* | 8/2022 | Yang | G06F 16/953 |

OTHER PUBLICATIONS

Verma et al., "A Novel Framework for Neural Architecture Search in the Hill Climbing Domain", 2019 IEEE Second International Conference on Artificial Intelligence and Knowledge Engineering (AIKE), Jun. 2019, pp. 1-8. (Year: 2019).*
Zhang et al., "Visual Search at Alibaba", ARXIV ID: 2102.04674, Feb. 9, 2021, pp. 1-9. (Year: 2021).*
Duggal et al., "Compatibility-aware Heterogeneous Visual Search", 2021 IEEE/CVF Conference on Computer Vision and Pattern Recognition (CVPR), Jun. 2021, pp. 10718-10727. (Year: 2021).*
Marošević et al., "Multiple ellipse fitting by center-based clustering." Croatian Operational Research Review. 6. 43-53, 2015.
Wikipedia, n-ellipse, https://en.wikipedia.org/w/index.php?title=N-ellipse&oldid=1047991317 , Oct. 3, 2021.
Vaswani et al., "Attention is all you need." Advances in neural information processing systems. 2017.
Github, Annoy (Approximate Nearest Neighbors Oh Yeah) Library, https://github.com/spotify/annoy , Mar. 2022.
Beaumont, R., Image Embeddings, https://rom1504.medium.com/image-embeddings-ed1b194d113e, Jul. 20, 2020.
Google.com, Machine Learning Crash Course, Embeddings, https://developers.google.com/machine-learning-crash-course/embeddings/video-lecture?hl=zh_cn , Feb. 2020.

* cited by examiner

ARTIFICIAL INTELLIGENCE-BASED TECHNIQUES FOR AUTOMATED VISUAL DATA SEARCHING USING EDGE DEVICES

FIELD

The field relates generally to information processing systems, and more particularly to techniques for data processing using such systems.

BACKGROUND

In conventional edge device-based event monitoring approaches, edge devices (e.g., cameras) collect videos and upload the videos to one or more cores (e.g., information technology infrastructure established in a data center, cloud, etc.), which analyze the data and broadcast analysis results to each edge device in the given network. However, in such conventional approaches, the cores often utilize models that require large training datasets and time-intensive training periods, significantly limiting the effectiveness of such approaches in new and/or time-sensitive scenarios not sufficiently covered by the existing training data.

SUMMARY

Illustrative embodiments of the disclosure provide techniques for artificial intelligence-based techniques for automated visual data searching using edge devices. An exemplary computer-implemented method includes obtaining visual data from one or more edge devices, generating at least one automated searching tool by processing at least a portion of the obtained data using one or more artificial intelligence techniques, and deploying the at least one automated searching tool to at least a portion of the one or more edge devices. The method also includes performing one or more automated actions based at least in part on data received, from at least a portion of the one or more edge devices, in connection with operation of the at least one automated searching tool.

Illustrative embodiments can provide significant advantages relative to edge device-based event monitoring approaches. For example, problems associated with time-intensive model training limitations are overcome in one or more embodiments through enabling automated visual data searching via edge devices by generating artificial intelligence-based searching tools.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
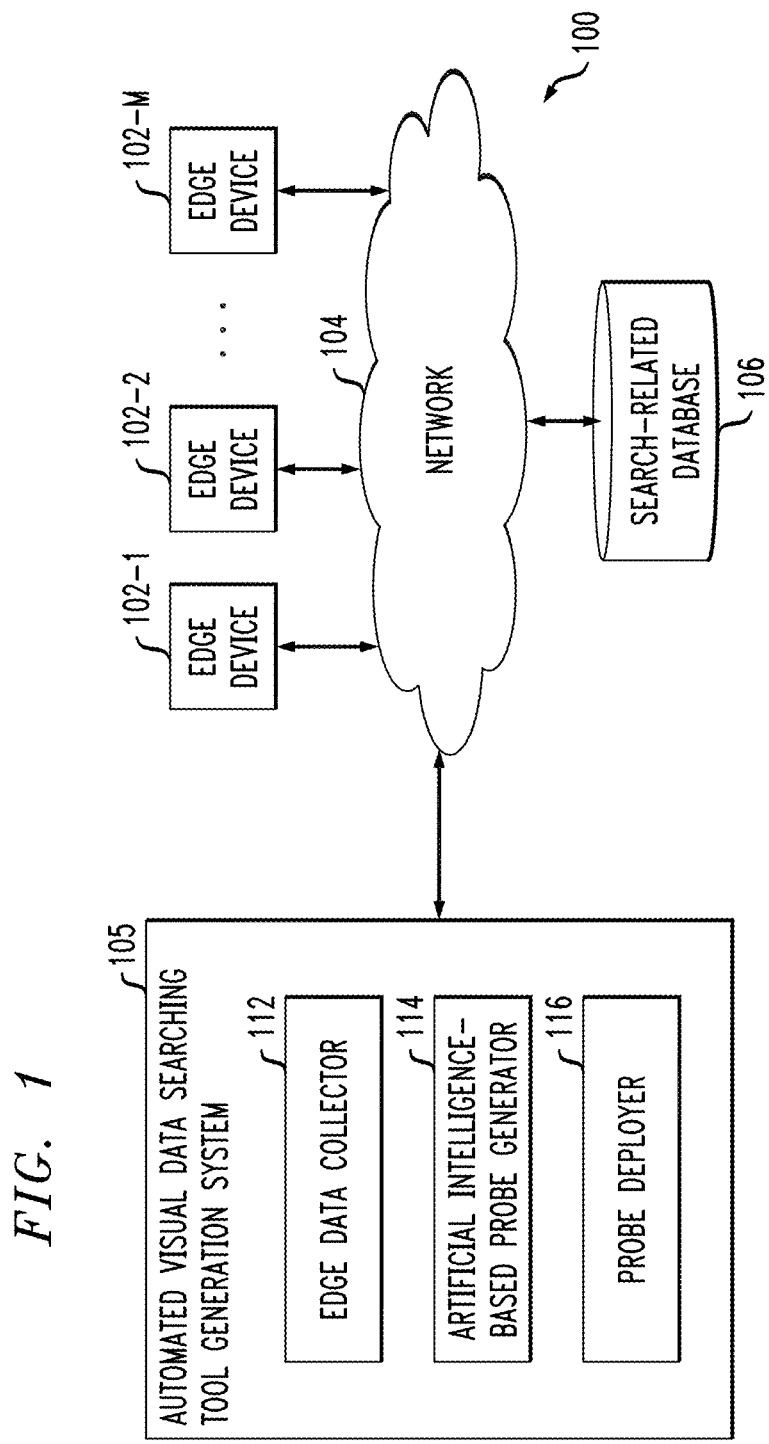
FIG. 1 shows an information processing system configured for artificial intelligence-based techniques for automated visual data searching using edge devices in an illustrative embodiment.

FIG. 1 shows a computer network (also referred to herein as an information processing system) 100 configured in accordance with an illustrative embodiment. The computer network 100 comprises a plurality of edge devices 102-1, 102-2, . . . 102-M, collectively referred to herein as edge devices 102. The edge devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. It is assumed that edge devices 102 communicate over network 104 with one or more cores which may comprise, e.g., cloud-based datacenters or other centralized components. Also coupled to network 104 is automated visual data searching tool generation system 105 (which can also, in one or more embodiments detailed herein, be referred to as a core or a portion thereof).

The edge devices 102 may comprise, for example, mobile telephones, laptop computers, tablet computers, desktop computers, smart traffic lights, servers deployed on edge sides, smart automobiles or other types of computing devices. Such devices are examples of what are more generally referred to herein as "processing devices." Some of these processing devices are also generally referred to herein as "computers."

The edge devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi® or WiMAX™ network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated visual data searching tool generation system 105 can have an associated search-related database 106 configured to store data pertaining to visual data searches and searching, which comprise, for example, edge device data, embedding vector data, image comparison data, etc.

The search-related database 106 in the present embodiment is implemented using one or more storage systems associated with automated visual data searching tool generation system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated visual data searching tool generation system 105 are one or more input-output devices, which illustratively comprise keyboards, displays or other types of input-output devices in any combination. Such input-output devices can be used, for example, to support one or more user interfaces to automated visual data searching tool generation system 105, as well as to support communication between automated visual data searching tool generation system 105 and other related systems and devices not explicitly shown.

Additionally, automated visual data searching tool generation system 105 in the FIG. 1 embodiment is assumed to be implemented using at least one processing device. Each such processing device generally comprises at least one processor and an associated memory, and implements one or more functional modules for controlling certain features of automated visual data searching tool generation system 105.

More particularly, automated visual data searching tool generation system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated visual data searching tool generation system 105 to communicate over the network 104 with the edge devices 102, and illustratively comprises one or more conventional transceivers.

The automated visual data searching tool generation system 105 further comprises edge data collector 112, artificial intelligence-based probe generator 114, and probe deployer 116.

It is to be appreciated that this particular arrangement of elements 112, 114 and 116 illustrated in the automated visual data searching tool generation system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for artificial intelligence-based techniques for real-time automated visual data searching involving edge devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated visual data searching tool generation system 105 and search-related database 106 can be on and/or part of the same processing platform.

An exemplary process utilizing elements 112, 114 and 116 of automated visual data searching tool generation system 105 in computer network 100 will be described in more detail with reference to the flow diagram of FIG. 5.

Accordingly, at least one embodiment includes generating and/or implementing artificial intelligence-based techniques for real-time automated visual data searching using edge devices. As further detailed herein, such an embodiment includes utilizing at least one deep learning-based embedding technique to encode at least a portion of a search query as one or more embedding vectors and one or more similarity thresholds. Such an embodiment can be implemented and/or executed as a lightweight automated searching tool referred to herein as a probe on one or more edge devices, detecting whether incoming data (e.g., images and/or frames) match a given search query. As used herein, a "probe," also referred to as an automated searching tool, comprises a set of information which can be used to determine whether given search criteria are matched in an input (image). In at least one example embodiment, a probe can include a vector of numbers (or, e.g., a list of numbers) which can be used to estimate the similarity and/or proximity of a new and/or different vector of numbers, wherein the new and/or different vector of numbers is extracted from an input image using a deep learning encoder. One or more embodiments can also include determining and/or screening data on an edge device, even if such data are not planned to be uploaded to a core.

As further detailed herein, and in contrast to disadvantageous conventional approaches, one or more embodiments include enabling searching and/or monitoring event-related data with modest data requirements and light targeted training constraints. Therefore, such embodiments can include quickly and/or efficiently implementing one or more related actions (which can be, for example, critical in emergency situations).

Referring again to FIG. 1, a framework for an example embodiment can include the following. Initially, edge data collector 112 obtains and/or collects data (e.g., in the form of one or more interest reports) from edge devices 102, wherein each edge device can provide and/or report data of interest. In at least one embodiment, such collected data can be small in size, such as, for example, less than ten frames from a video, an image and/or one or more annotations or comments, etc.

As noted above and further detailed herein, data of interest can include, for example, partial data which contains one or more predetermined and/or salient features. For instance, and by way merely of illustration, comments included with reported images might include text such as "Flooded street!" In such a scenario, the word "street" provides insight in that the interesting region is likely to be located at the bottom of the image. Accordingly, one or more embodiments can include partitioning and/or cutting the image and only extracting the embedding vectors for the bottom part of the image.

Additionally, in one or more embodiments, multiple techniques can be implemented to recognize data of interest in connection with an edge device. For example, such an embodiment can include using natural language processing techniques, one or more attention mechanisms, and/or manual recognition techniques.

Referring again to FIG. 1, artificial intelligence-based probe generator 114 then generates at least one probe based at least in part on the data collected by edge data collector 112. In one or more embodiments, artificial intelligence-based probe generator 114 uses at least one deep learning embedding technique to extract portions of the content of the collected data as one or more embedding vectors (also referred to herein as one or more dense vectors). In deep learning, an embedding generally refers to a continuous, fixed-length vector representation of something. More generally, an embedding can refer to a relatively low-dimensional space into which one or more high-dimensional vectors can be translated. Embeddings can facilitate machine learning techniques in connection with large inputs such as, for example, sparse vectors representing words. In such an instance, an embedding can capture at least a portion of the semantics of an input by placing semantically similar inputs close together in the embedding space. Moreover, an embedding can be learned and reused across models, By defining one or more similarity thresholds around such vectors, at least one embodiment can include determining at least one matched area related to the collected data (such as further detailed herein). In one or more embodiments, such a matched area can be used, for example, to recognize whether at least a portion of a new image matches at least a portion of content of interest (e.g., as derived from the collected data). Accordingly, such an embodiment includes implementing artificial intelligence-based feature extraction instead of training an entire artificial intelligence model, rendering such an embodiment more targeted and considerably faster and more efficient than conventional approaches.

Additionally, referring again to FIG. 1, the probe deployer 116 determines (e.g., using priority logic associated with the user and/or enterprise) whether to broadcast, to at least a portion of the edge devices 102, the at least one probe generated by artificial intelligence-based probe generator 114. If yes (that is, the probe deployer 116 decides to broadcast the at least one probe), the probe deployer 116 transfers the at least one probe to one or more of the edge devices 102 via network 104. In one or more embodiments, a generated probe can be of a size of approximately hundreds to thousands of float numbers, and as such, can be efficiently transferred in a network.

Subsequent to the probe deployer 116 broadcasting at least one probe to one or more edge devices 102, each such edge device receiving the probe can use the probe to detect new data of interest, and report the same back to automated visual data searching tool generation system 105 in a time-sensitive manner (e.g., in real-time). Additionally, in one or more embodiments, one or more of the edge devices 102, using the probe, can notify automated visual data searching tool generation system 105 if new content (e.g., an image detected in real-time by the edge device) matches probe-related content.

As detailed herein, at least one embodiment includes implementing a deep learning-based embedding representation technique, which processes unstructured data (e.g., image data, natural language data, audio data, video data, etc.) via input of a deep learning network. In one or more example deep learning model structures, features of input data can be extracted through the layers of the deep learning model, and can be represented as one or more embedding vectors (also referred to herein as one or more dense vectors). Embedding vectors can, for example, capture the input data's features from a general understanding perspective. For example, when extraction layers of the deep learning model are trained on a sufficient dataset, the layers have sufficient capability of capturing one or more features from the input data. Accordingly, in at least one embodiment, one or more pre-trained models (e.g., ImageNet for image embedding, bidirectional encoder representations from transformers (BERT) for text embedding, etc.) can be used to generate embeddings in artificial intelligence model training.

Figure 2:
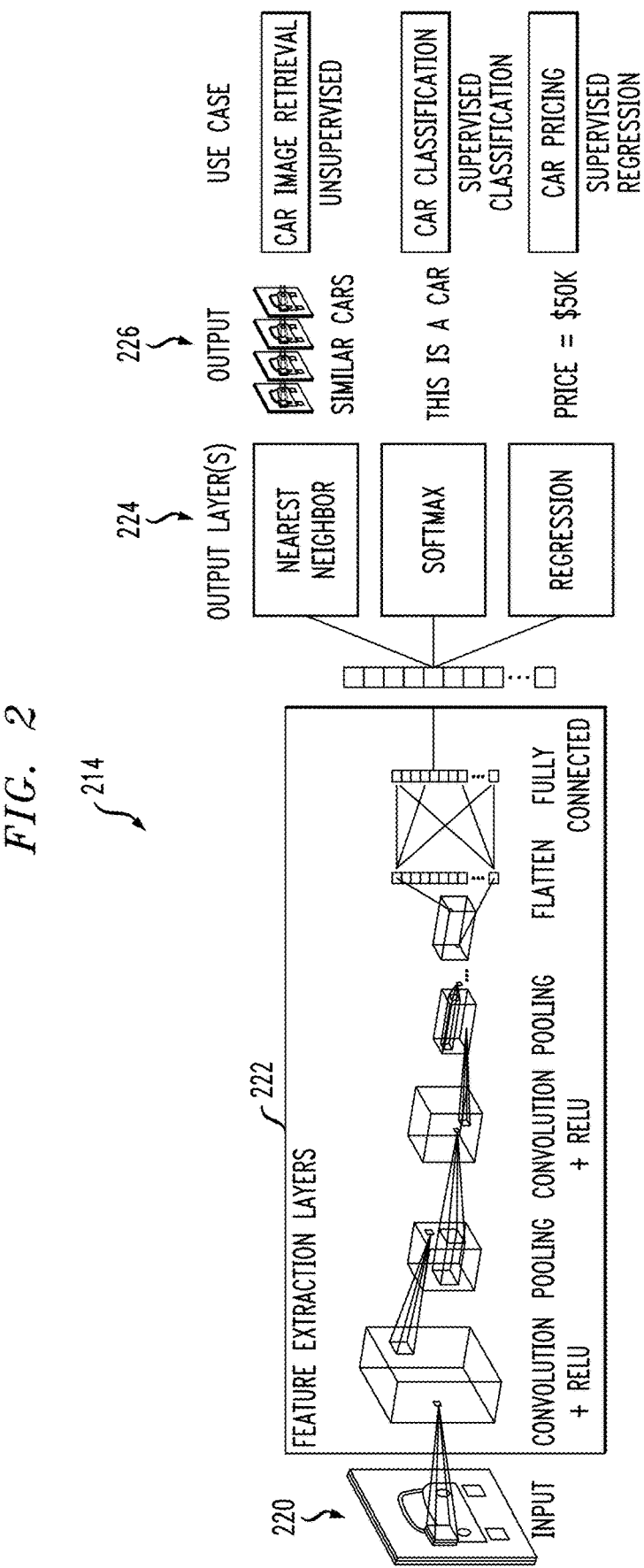
FIG. 2 shows at least a portion of an example artificial intelligence-based probe generator in an illustrative embodiment.

FIG. 2 shows at least a portion of an example artificial intelligence-based probe generator 214 in an illustrative embodiment. By way of illustration, FIG. 2 depicts a convolutional neural network (CNN) embedding technique which includes processing input 220 (e.g., image data related to a car) using feature extraction layers 222, which include at least a first convolution and rectified linear unit (ReLU) activation function layer, at least a first pooling layer, at least a second convolution and ReLU activation function layer, at least a second pooling layer, at least one flatten layer, and at least one fully connected layer. As also depicted in FIG. 2, output from the processing performed by feature extraction layers 222 is then processed using one or more output layers 224, which can include at least one nearest neighbor algorithm, at least one softmax function, and at least one regression function. Output layer(s) 224 can produce one or more outputs 226 related to one or more use cases (e.g., identification of similar cars for a car image retrieval use case, identification of the input image data as a car for a car classification use case, pricing information pertaining to the identified car for a car pricing use case, etc.).

Figure 3:
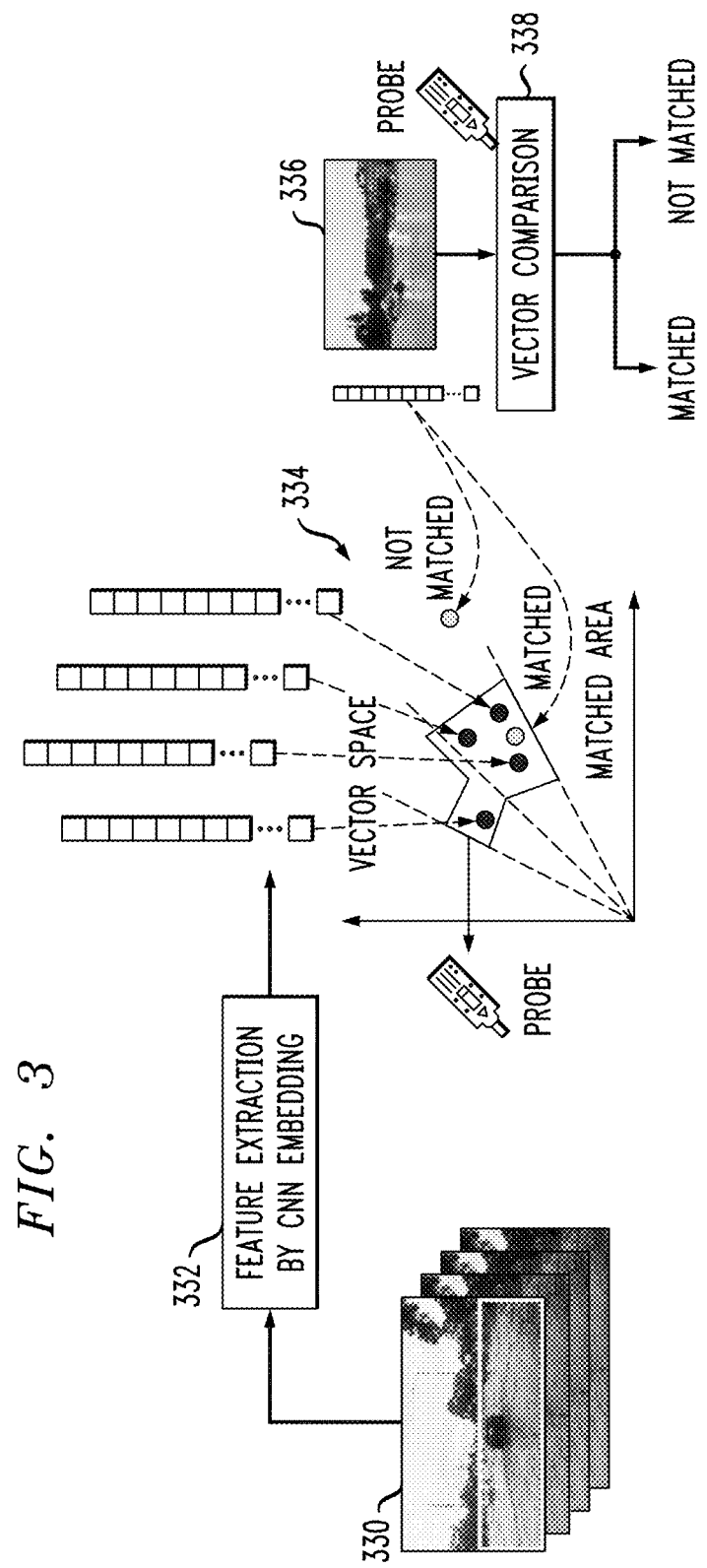
FIG. 3 shows an example workflow for defining a matched area in an illustrative embodiment.

FIG. 3 shows an example workflow for defining a matched area in an illustrative embodiment. As depicted in FIG. 3, upon receiving images of interest 330 (e.g., from edge data collector 112 in the FIG. 1 embodiment), an artificial intelligence-based probe generator (e.g., 114 in the FIG. 1 embodiment and/or 214 in the FIG. 2 embodiment) performs feature extraction 332 by translating at least a portion of the images into one or more embedding vectors (also referred to herein as dense vectors) using at least one CNN embedding technique (such as depicted, for example, in FIG. 2). In at least one example embodiment, each generated embedding vector (dense vector) is a vector of 1,000-4,000 float numbers, with different lengths according to the pre-trained model used. If, by way merely of example, the vectors are projected to a high-dimension space with 1,000-4,000 dimensions, those points can be envisioned to be located in some given area (as depicted via vector space 334). If enveloping boundaries are defined to include the points inside that given area, a similar area can be defined which includes the provided points. In at least one embodiment, such a defined area is referred to as a matched area.

Additionally, and as also depicted in FIG. 3, when a new image 336 is obtained, one or more embodiments includes encoding the new image 336 as an embedding vector (dense vector), and then performing a vector comparison 338 to determine if the newly-encoded embedding vector is positioned in the defined matched area. If yes, then this new image is deemed similar to the reported input images (that is, the new image is also of interest with respect to the use case in question). Also, in at least one embodiment, encoding data (such as input image data) as one or more embedding vectors and defining the corresponding matched area is included as at least part of the process of probe-making performed, for example, by an artificial intelligence-based probe generator (e.g., 114 in the FIG. 1 embodiment).

Additionally or alternatively, a matched area can be defined as a tuple (or set of tuples) as: [distance metric, centroid, distance threshold], wherein one tuple represents one continuous area. If a matched area encompasses a set of separate areas, each area, in one or more embodiments, can be parameterized as a tuple. A new image is matched, for example, if the distance between the new image's embedding vector and centroid are below a given distance threshold, wherein the distance is calculated using at least one distance metric (e.g., Euclidean distance, Manhattan distance, cosine distance, Hamming distance, dot (inner) product distance, etc.). The centroid calculation method can depend, for example, on the distance metric definition.

Figure 4:
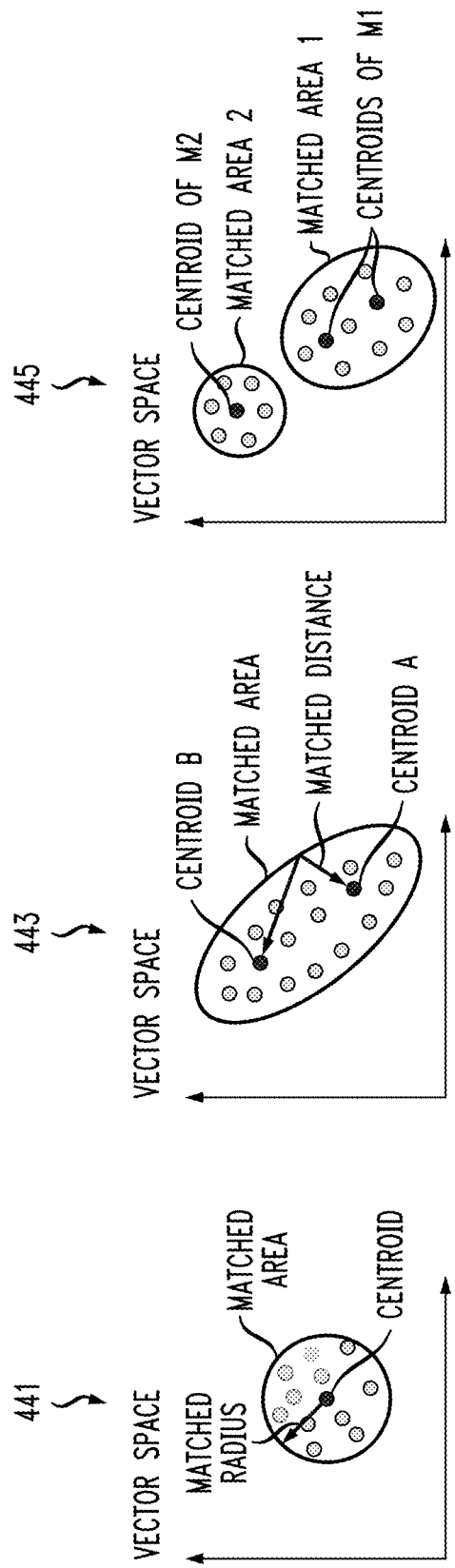
FIG. 4 shows a variety of example matched areas in an illustrative embodiment.

FIG. 4 shows a variety of example matched areas in an illustrative embodiment. By way of illustration, FIG. 4 depicts a single circular cluster with a single centroid 441, a single ellipsoidal cluster with multiple centroids 443, and a set of multiple clusters 445. More specifically, single circular cluster with a single centroid 441 can be generated, for example, using an average calculation, which fits when the reported points make a single circular area. Then, in one or more embodiments, the average of all reported embedding vectors ($V_i$) can be calculated on each dimension as $$\bar{V} = \frac{1}{N}\sum_N V_i,$$

and the corresponding similarity threshold can be calculated as the radius thereof, wherein N represents the number of reported points. Additionally, the radius of the cluster can be calculated as $$\bar{r} = \frac{1}{N}\sum_N |V_i - \bar{V}|,$$

and accordingly, matched and not-matched determinations (with respect to new vectors ($V_{new}$)) can be made as follows:

$$\begin{cases} \text{matched,} & |V_{new} - \bar{V}| \leq \bar{r} \\ \text{not-matched,} & |V_{new} - \bar{V}| > \bar{r} \end{cases}.$$

Such a matched area definition can be implemented, for example, when the reported points concentrate in a circular-shaped area. Other embodiments can include calculating weighted averages when the points have a different density distribution.

In connection with a single ellipsoidal cluster with multiple centroids 443, as depicted in FIG. 4, at least one embodiment can include using mathematical techniques to calculate such a non-circular-shaped centroid and the corresponding semi-major axis. For an ellipse, the matched rule can include an indication that a new point is, $$\begin{cases} \text{matched,} & |V_{new} - \bar{C}_1| + |V_{new} - \bar{C}_2| \leq 2a \\ \text{not-matched,} & |V_{new} - \bar{C}_1| + |V_{new} - \bar{C}_2| > 2a \end{cases},$$

wherein $\bar{C}_1$ and $\bar{C}_2$ are the two centroids of an ellipse area, and a is the semi-major axis of the ellipse. Other embodiments can include defining a more generalized shape, such as an n-ellipse, which can have more than two centroids.

With respect to a set of multiple clusters 445, the area of reported points can be scattered instead of concentrated as a single shape. In such instances, at least one embodiment can include using one or more clustering algorithms to split the reported points into multiple groups, and defining the shape (e.g., circle, ellipse, n-ellipse, etc.) for each group. Accordingly, in such an embodiment, the matched rule can be defined as:

$$\begin{cases} \text{matched,} & \text{point match one of the cluster} \\ \text{not-matched,} & \text{point dismatch any clusters} \end{cases}.$$

Additionally, in at least one embodiment, an attention mechanism can be implemented, in connection with one or more specific regions of interest, to determine a proper range for performing embedding extraction. For example, the comments with a set of reported images may include the phrase "flooded street." In such an example, the word "street" provides an insight that the region of interest is located at the bottom portion of the image. Accordingly, such an embodiment can include cutting or dividing the image, and extracting the embedding vector(s) for only the bottom portion of the image.

By way merely of illustration, consider the following example use case for implementation of one or more embodiments. Videos of cars driving on a flooded street are obtained and/or collected from one or more data sources (e.g., edge devices, social media platforms, etc.), and such videos are used to simulate a city emergency. Additionally, one edge device has reported its finding in the form of 10 uploaded frames of a flooded street. An example embodiment can include using at least a portion of the 10 uploaded frames (images) to generate a probe, and then broadcasting the probe to one or more other edge devices within a given network and/or geographic region. From the perspective of those edge devices (e.g., devices associated with cars on roads), the probe can enable a capability of recognizing the flooded street automatically. As time goes by, more edge devices may report flooded streets by using the probe, and the system (e.g., a core) can receive the new reports from those edge devices, and view the reports on a map, which can enable determining that the area with the most reports represent a flooded area and a potential emergency situation.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 5:
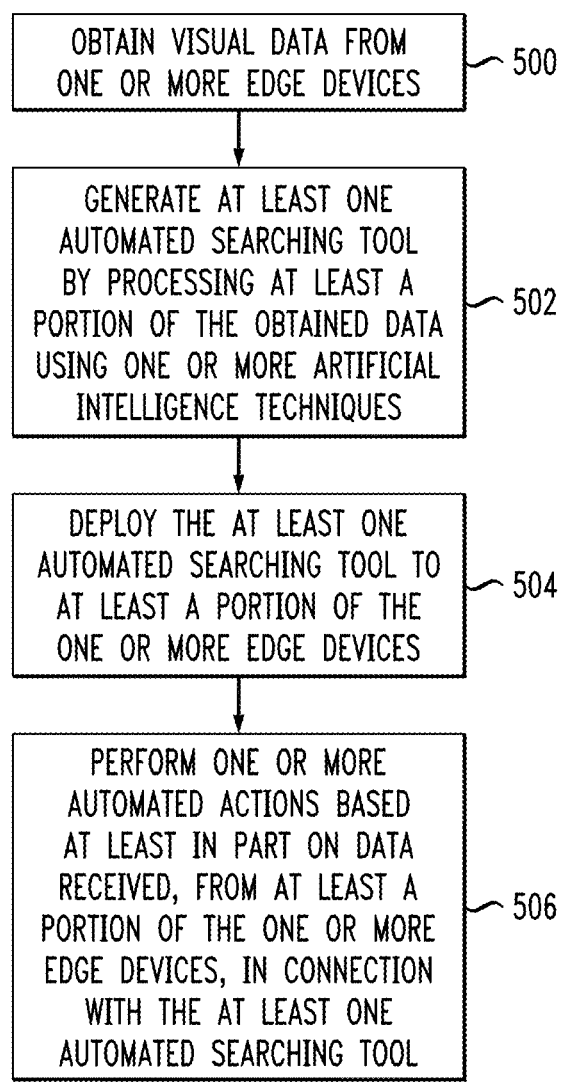
FIG. 5 is a flow diagram of a process for artificial intelligence-based techniques for automated visual data searching using edge devices in an illustrative embodiment.

FIG. 5 is a flow diagram of a process for artificial intelligence-based techniques for automated visual data searching using edge devices in an illustrative embodiment. It is to be understood that this particular process is only an example, and additional or alternative processes can be carried out in other embodiments.

In this embodiment, the process includes steps 500 through 506. These steps are assumed to be performed by the automated visual data searching tool generation system 105 utilizing elements 112, 114 and 116.

Step 500 includes obtaining visual data from one or more edge devices. In at least one embodiment, obtaining data from the one or more edge devices includes obtaining at least one of image data, video data, and text data from one or more edge devices.

Step 502 includes generating at least one automated searching tool by processing at least a portion of the obtained data using one or more artificial intelligence techniques. In one or more embodiments, the at least one automated searching tool includes a given number of float numbers that is below a predetermined threshold.

Also, in at least one embodiment, generating the at least one automated searching tool includes extracting at least a portion of content from the obtained data as one or more embedding vectors using at least one deep learning embedding technique. In such an embodiment, extracting at least a portion of content from the obtained data as one or more embedding vectors using at least one deep learning embedding technique includes processing at least a portion of the obtained data through multiple feature extraction-related layers of a deep learning network, wherein the multiple feature extraction-related layers comprise one or more convolution and rectified linear unit activation function layers, one or more pooling layers, one or more flatten layers, and one or more fully connected layers. Further, extracting at least a portion of content from the obtained data as one or more embedding vectors using at least one deep learning embedding technique can include processing output from the multiple feature extraction-related layers using one or more output layers, wherein the one or more output layers comprise one or more of at least one nearest neighbor algorithm, at least one softmax function, and at least one regression function.

Additionally or alternatively, generating the at least one automated searching tool can include determining at least one matched area associated with the one or more embedding vectors based at least in part on defining one or more similarity thresholds for the one or more embedding vectors. In such an embodiment, generating the at least one automated searching tool includes defining the at least one matched area as at least one tuple comprising a distance metric, a centroid, and a distance threshold.

Step 504 includes deploying the at least one automated searching tool to at least a portion of the one or more edge devices.

Step 506 includes performing one or more automated actions based at least in part on data received, from at least a portion of the one or more edge devices, in connection with operation of the at least one automated searching tool. In at least one embodiment, performing one or more automated actions includes determining whether at least a portion of the data received from the one or more edge devices corresponds to the at least one matched area. Additionally or alternatively, performing one or more automated actions can include automatically generating and outputting at least one notification to at least one external system, wherein the at least one notification pertains at least to geographic information associated with the data received from the at least a portion of the one or more edge devices in connection with operation of the at least one automated searching tool. Further, performing one or more automated actions can include automatically training the one or more artificial intelligence techniques using at least a portion of the data received from the at least a portion of the one or more edge devices in connection with operation of the at least one automated searching tool.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to enable automated visual data searching via edge devices by generating artificial intelligence-based searching tools. These and other embodiments can effectively overcome problems associated with conventional edge device-based event monitoring approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
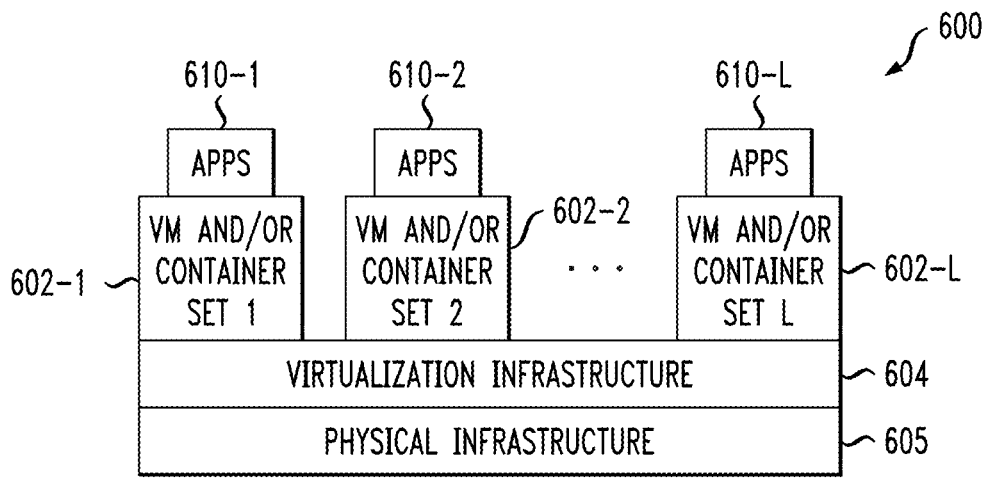
FIGS. 6 and 7 show examples of processing platforms that may be utilized to implement at least a portion of an information processing system in illustrative embodiments.
Figure 7:
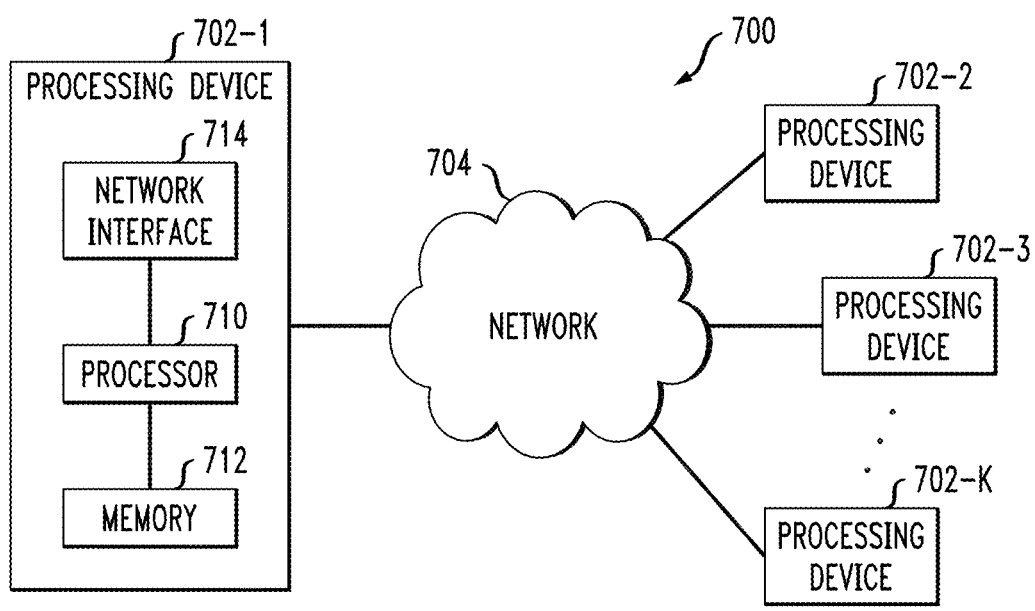

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi® or WiMAX™ network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining visual data from one or more edge devices;
generating at least one automated searching tool by processing at least a portion of the obtained visual data using one or more artificial intelligence techniques, wherein generating the at least one automated searching tool comprises:
extracting content from the obtained visual data as one or more embedding vectors using at least one deep learning embedding technique; and
defining multiple portions of the one or more embedding vectors for use in matching with one or more portions of input images, wherein the multiple portions of the one or more embedding vectors are defined as a plurality of distinct data structures representing distinct content associated with the one or more embedding vectors, and wherein the plurality of distinct data structures each comprise at least one distance metric, at least one centroid calculation result, and at least one distance threshold value;
deploying the at least one automated searching tool to at least a portion of the one or more edge devices; and
performing one or more automated actions based at least in part on data received, from the at least a portion of the one or more edge devices, in connection with operation of the at least one automated searching tool;
wherein the method is performed by at least one processing device comprising a processor coupled to a memory.

2. The computer-implemented method of claim 1, wherein extracting the content from the obtained visual data as the one or more embedding vectors using the at least one deep learning embedding technique comprises processing the at least a portion of the obtained visual data through multiple feature extraction-related layers of a deep learning network, wherein the multiple feature extraction-related layers comprise one or more convolution and rectified linear unit activation function layers, one or more pooling layers, one or more flatten layers, and one or more fully connected layers.

3. The computer-implemented method of claim 2, wherein extracting the content from the obtained visual data as the one or more embedding vectors using the at least one deep learning embedding technique further comprises processing output from the multiple feature extraction-related layers using one or more output layers, wherein the one or more output layers comprise one or more of at least one nearest neighbor algorithm, at least one softmax function, and at least one regression function.

4. The computer-implemented method of claim 1, wherein generating the at least one automated searching tool further comprises defining one or more similarity thresholds for the one or more embedding vectors.

5. The computer-implemented method of claim 1, wherein performing the one or more automated actions comprises determining whether at least a portion of the data received from the at least a portion of the one or more edge devices corresponds to at least one of multiple areas.

6. The computer-implemented method of claim 1, wherein the at least one automated searching tool comprises a given number of float numbers that is below a predetermined threshold.

7. The computer-implemented method of claim 1, wherein performing the one or more automated actions comprises automatically generating and outputting at least one notification to at least one external system, wherein the at least one notification pertains at least to geographic information associated with the data received from the at least a portion of the one or more edge devices in connection with the operation of the at least one automated searching tool.

8. The computer-implemented method of claim 1, wherein performing the one or more automated actions comprises automatically training the one or more artificial intelligence techniques using at least a portion of the data received from the at least a portion of the one or more edge devices in connection with the operation of the at least one automated searching tool.

9. The computer-implemented method of claim 1, wherein obtaining the visual data from the one or more edge devices comprises obtaining at least one of image data, video data, and text data from the one or more edge devices.

10. A non-transitory processor-readable storage medium having stored therein program code of one or more software programs, wherein the program code when executed by at least one processing device causes the at least one processing device:
to obtain visual data from one or more edge devices;
to generate at least one automated searching tool by processing at least a portion of the obtained visual data using one or more artificial intelligence techniques, wherein generating the at least one automated searching tool comprises:
extracting content from the obtained visual data as one or more embedding vectors using at least one deep learning embedding technique; and
defining multiple portions of the one or more embedding vectors for use in matching with one or more portions of input images, wherein the multiple portions of the one or more embedding vectors are defined as a plurality of distinct data structures representing distinct content associated with the one or more embedding vectors, and wherein the plurality of distinct data structures each comprise at least one distance metric, at least one centroid calculation result, and at least one distance threshold value;
to deploy the at least one automated searching tool to at least a portion of the one or more edge devices; and
to perform one or more automated actions based at least in part on data received, from the at least a portion of the one or more edge devices, in connection with operation of the at least one automated searching tool.

11. The non-transitory processor-readable storage medium of claim 10, wherein extracting the content from the obtained visual data as the one or more embedding vectors using the at least one deep learning embedding technique comprises processing the at least a portion of the obtained visual data through multiple feature extraction-related layers of a deep learning network, wherein the multiple feature extraction-related layers comprise one or more convolution and rectified linear unit activation function layers, one or more pooling layers, one or more flatten layers, and one or more fully connected layers.

12. The non-transitory processor-readable storage medium of claim 11, wherein extracting the content from the obtained visual data as the one or more embedding vectors using the at least one deep learning embedding technique further comprises processing output from the multiple feature extraction-related layers using one or more output layers, wherein the one or more output layers comprise one or more of at least one nearest neighbor algorithm, at least one softmax function, and at least one regression function.

13. The non-transitory processor-readable storage medium of claim 10, wherein performing the one or more automated actions comprises automatically training the one or more artificial intelligence techniques using at least a portion of the data received from the at least a portion of the one or more edge devices in connection with the operation of the at least one automated searching tool.

14. An apparatus comprising:
at least one processing device comprising a processor coupled to a memory;
the at least one processing device being configured:
to obtain visual data from one or more edge devices;
to generate at least one automated searching tool by processing at least a portion of the obtained visual data using one or more artificial intelligence techniques, wherein generating the at least one automated searching tool comprises:
extracting content from the obtained visual data as one or more embedding vectors using at least one deep learning embedding technique; and
defining multiple portions of the one or more embedding vectors for use in matching with one or more portions of input images, wherein the multiple portions of the one or more embedding vectors are defined as a plurality of distinct data structures representing distinct content associated with the one or more embedding vectors, and wherein the plurality of distinct data structures each comprise at least one distance metric, at least one centroid calculation result, and at least one distance threshold value;
to deploy the at least one automated searching tool to at least a portion of the one or more edge devices; and
to perform one or more automated actions based at least in part on data received, from the at least a portion of the one or more edge devices, in connection with operation of the at least one automated searching tool.

15. The apparatus of claim 14, wherein extracting the content from the obtained visual data as the one or more embedding vectors using the at least one deep learning embedding technique comprises processing the at least a portion of the obtained visual data through multiple feature extraction-related layers of a deep learning network, wherein the multiple feature extraction-related layers comprise one or more convolution and rectified linear unit activation function layers, one or more pooling layers, one or more flatten layers, and one or more fully connected layers.

16. The apparatus of claim 14, wherein performing the one or more automated actions comprises automatically training the one or more artificial intelligence techniques using at least a portion of the data received from the at least a portion of the one or more edge devices in connection with the operation of the at least one automated searching tool.

17. The apparatus of claim 14, wherein generating the at least one automated searching tool further comprises defining one or more similarity thresholds for the one or more embedding vectors.

18. The apparatus of claim 14, wherein performing the one or more automated actions comprises determining whether at least a portion of the data received from the at least a portion of the one or more edge devices corresponds to at least one of multiple areas.

19. The apparatus of claim 14, wherein the at least one automated searching tool comprises a given number of float numbers that is below a predetermined threshold.

20. The apparatus of claim 14, wherein performing the one or more automated actions comprises automatically generating and outputting at least one notification to at least one external system, wherein the at least one notification pertains at least to geographic information associated with the data received from the at least a portion of the one or more edge devices in connection with the operation of the at least one automated searching tool.

\* \* \* \* \*